(12) United States Patent
Chung et al.

(10) Patent No.: US 7,701,518 B2
(45) Date of Patent: *Apr. 20, 2010

(54) METHODS AND SYSTEMS FOR DISPLAYING VIDEO IN MULTIPLE ASPECT RATIOS

(75) Inventors: Yau Wing Chung, Fremont, CA (US); Justin Halls, Penzance (GB)

(73) Assignee: Optoma Technology, Inc., Milpitas, CA (US)

( * ) Notice: Subject to any disclaimer, the term of this patent is extended or adjusted under 35 U.S.C. 154(b) by 1216 days.

This patent is subject to a terminal disclaimer.

(21) Appl. No.: 11/249,316

(22) Filed: Oct. 14, 2005

(65) Prior Publication Data
US 2007/0024750 A1 Feb. 1, 2007

Related U.S. Application Data

(60) Provisional application No. 60/703,433, filed on Jul. 29, 2005.

(51) Int. Cl.
*H04N 3/223* (2006.01)
*H04N 9/74* (2006.01)

(52) U.S. Cl. .................. 348/747; 348/580; 348/581

(58) Field of Classification Search .......... 348/739, 348/744, 747, 776, 781, 785, 786, 790, 795, 348/806, 580, 581, 575; 359/461; 353/69; *H04N 5/66, H04N 5/64, 3/223, 5/74, 9/12*
See application file for complete search history.

(56) References Cited

U.S. PATENT DOCUMENTS

| | | | |
|---|---|---|---|
| 5,146,331 A | 9/1992 | Tsuchida | |
| 5,264,929 A | 11/1993 | Yamaguchi | |
| 5,323,235 A | 6/1994 | Tonomura | |
| 5,481,299 A | 1/1996 | Coffey et al. | |
| 5,572,263 A | 11/1996 | Kim et al. | |
| 5,795,046 A | 8/1998 | Woo | |
| 5,949,494 A | 9/1999 | Yamagata | |
| 6,122,018 A | 9/2000 | Sugihara et al. | |
| 6,154,256 A | 11/2000 | Bruins | |
| 6,473,135 B1 | 10/2002 | Iwamura | |
| 6,511,185 B1 | 1/2003 | Gananathan | |
| 6,591,314 B1 | 7/2003 | Colbath | |
| 6,690,425 B1 | 2/2004 | Worrell | |
| 6,755,540 B1 | 6/2004 | Runco | |
| 6,830,341 B2 | 12/2004 | Ejiri | |
| 6,857,750 B2 | 2/2005 | Shimizu | |
| 6,932,479 B2 | 8/2005 | Kobayashi | |
| 6,932,480 B2 | 8/2005 | Wada | |
| 6,935,751 B2 | 8/2005 | Rieche | |

(Continued)

OTHER PUBLICATIONS

Dustin Sorenson, Current Video Projector Technologies, Dell White Paper, Jun. 2002, pp. 1-9.

*Primary Examiner*—Sherrie Hsia
(74) *Attorney, Agent, or Firm*—MH2 Technology Law Group

(57) ABSTRACT

Systems and methods which can shift video to the edge of the display screen. The user can electrically and mechanically roll up or down the projection screen to fit the opposite edge. Further, the electrically shifted position can be memorized in memory, which will be easily recalled during future use. Also, to avoid displaying visible noise near the top edge of the video, the video may be shifted to avoid such noise being visible. The shifted position may be stored in memory to be recalled for future use.

20 Claims, 18 Drawing Sheets

U.S. PATENT DOCUMENTS 7,061,552 B1 * 6/2006 Patten et al. ................ 348/806
7,167,216 B2 * 1/2007 Childers .................... 348/747
7,357,514 B2 * 4/2008 Halls et al. .................... 353/57

* cited by examiner

METHODS AND SYSTEMS FOR DISPLAYING VIDEO IN MULTIPLE ASPECT RATIOS

CROSS-REFERENCE TO RELATED APPLICATIONS

This application claims priority to U.S. Provisional Patent Application Ser. No. 60/703,433 filed on Jul. 29, 2005, the disclosure of which is incorporated in its entirety by reference herein.

FIELD

Aspects of the present invention generally relate to video display methods and systems.

BACKGROUND

Traditional methods of displaying video in an aspect ratio different than the aspect ratio of the display medium require projecting the image in the middle of the screen and resizing the video. FIG. 1 illustrates a video 104 projected onto a display screen 102 according to the traditional method. As seen in FIG. 1a, since the aspect ratio of video 104 differs from that of display screen 102, video 104 does not fit display screen in proper proportion. As a result, bars 106 or 108, which are the color of display screen 102, appear at the top and the bottom of video 104. Usually, bars 106 and 108 differ in color from video 104 and, thus, may distract a user viewing video 104.

In order for video 104 to fit display screen 102 in better proportion, the user may scale the width of video 104 to the maximum horizontal width of the display device to fit display screen 102. Then, the display device or the user scales the height of video 104 proportionally according to the aspect ratio of video 104. FIG. 1b illustrates scaling or "stretching" video image 104 to fit display screen 102. However, once the user scales video 104 to fit display screen 102, scaling errors may be introduced into video 104. Thus, the quality of video 104 would be reduced and the viewing experience for the user would be degraded.

Furthermore, FIG. 1c illustrates noise 110 which often appears near the top edges of a video 104. Traditional methods use an overscan technique to slightly zoom in video 104 a few percent to avoid such noises being visible to a viewer. Once the user scales video 104 as in FIG. 1b, however, noise 110 may become visible to the user.

SUMMARY

Aspects of the present invention concern a method of displaying video, comprising: projecting the video onto a viewing screen, determining if an aspect ratio of the video matches dimensions of the viewing screen, shifting the video to align a first edge of the video with a first edge of the viewing screen, moving the viewing screen to align a second edge of the viewing screen with a second edge of the video, and storing a position of the video in a memory.

Further, aspects of the present invention concern a method of displaying video, comprising: projecting the video onto a viewing screen, determining if the video contains errors, shifting the video to display only portions of the video that do not contain errors, moving the viewing screen to align the viewing screen with the video, and storing a position of the video in a memory device.

Further, aspects of the present invention concern a system for displaying video, comprising: a video source device for generating a video signal, a front video projection device coupled to the video source device for generating a video image based on the video signal, wherein the video projection device includes a lens capable of shifting video generated by the video projection device, and a video display screen for displaying video generated by the video projection device, wherein the video display screen is capable of being resized to fit the shifted video generated by the video projection device.

Further, aspects of the present invention concern a system for displaying video, comprising: a video source device for generating a video signal, a rear video projection device coupled to the video source device for generating a video image based on the video signal, wherein the video projection device includes a lens capable of shifting video generated by the video projection device, and a video display screen for displaying video generated by the video projection device, wherein the video display screen is capable of being resized to fit the shifted video generated by the video projection device.

Further, aspects of the present invention concern a system for displaying video, comprising: means for generating a video signal; means for generating a video image based on the video signal, means for shifting video generated by the video projection device; means for storing a shifted video position; and means for displaying video generated by the video projection device.

Additional aspects of the present invention will be set forth in part in the description which follows, and in part will be obvious from the description, or may be learned by practice of the invention. The aspects of the present invention will be realized and attained by means of the elements and combinations particularly pointed out in the appended claims.

Further, it is to be understood that both the foregoing general description and the following detailed description are exemplary and explanatory only and are not restrictive of the present invention, as claimed.

The accompanying drawings, which are incorporated in and constitute a part of this specification, illustrate several aspects of the present invention and together with the description, serve to explain the principles of the invention.

DETAILED DESCRIPTION

Reference will now be made in detail to various aspects of the present invention, examples of which are illustrated in the accompanying drawings. Wherever possible, the same reference numbers will be used throughout the drawings to refer to the same or like parts.

Aspects of the present invention relate to systems and methods which can shift video to the edge of the display screen. The user can electrically and mechanically roll up or down the projection screen to fit the opposite edge. In other words, display screen size is changed to match the size of the projected image. Since the screen edge is black in color, the color of the unutilized viewing screen becomes invisible to the user and, hence, gives a more satisfactory viewing experience of the video. Further, the electrically shifted position can be memorized in memory, which will be easily recalled during future use.

Also, to avoid displaying visible noise near the top edge of the video, the video may be shifted to avoid such noise being visible. The shifted position may be stored in memory to be recalled for future use. Aspects of the present invention may be used with both front projection video system and rear projection video systems. Further aspects of the invention relate to systems and methods which optimally fit an image to the actual viewing area of a display screen with or without covers for the display screen. Video may be resized in both the horizontal and vertical direction to fit a display screen.

Figure 1A:
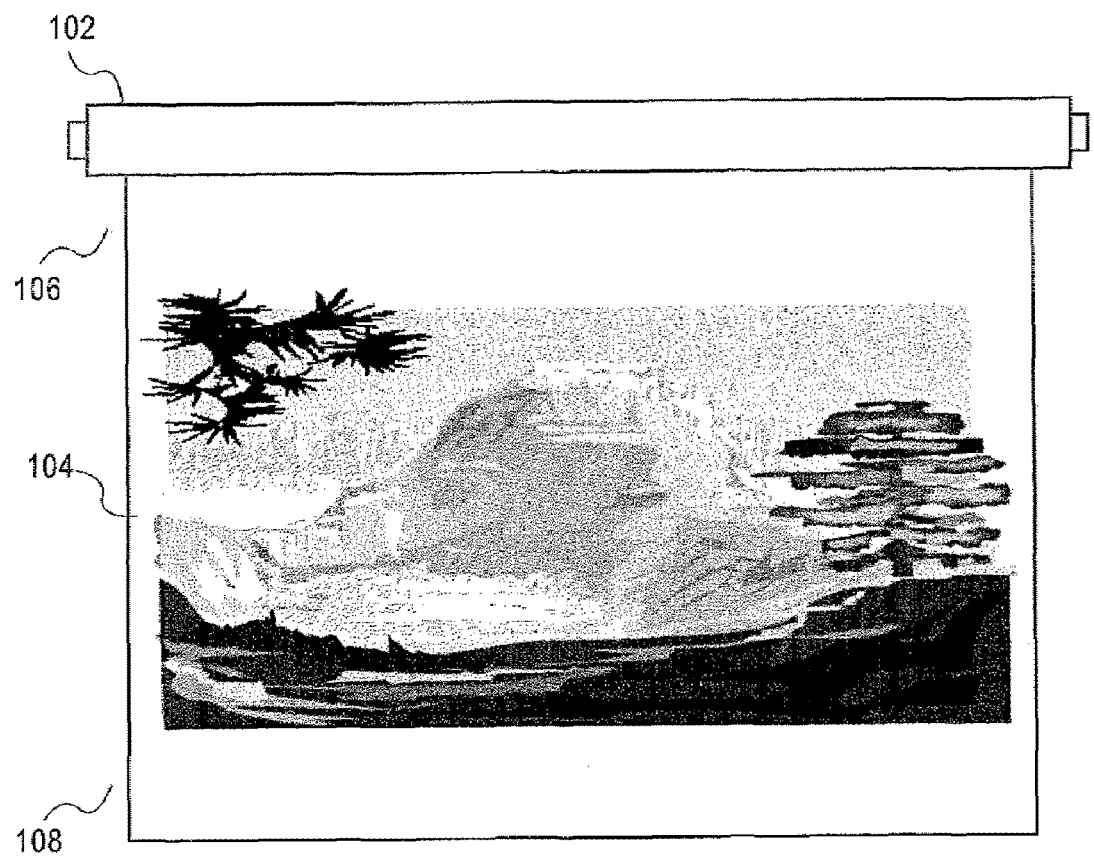
FIG. 1a is a diagram illustrating a traditional method for displaying a video image.
Figure 1B:
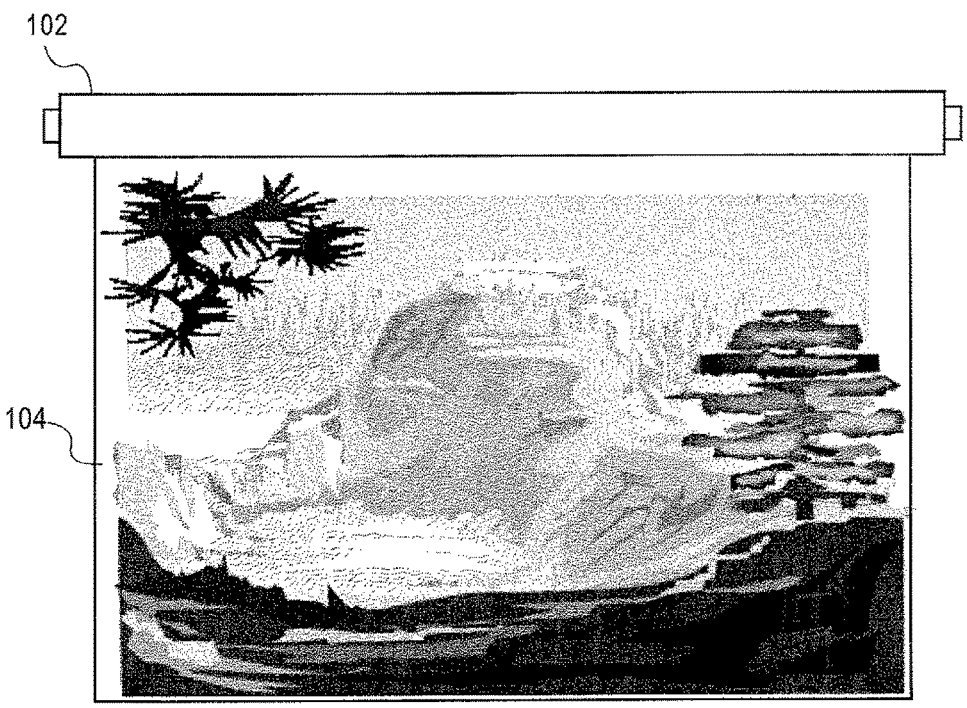
FIG. 1b is a diagram illustrating a traditional method of zooming and displaying a video image.
Figure 1C:
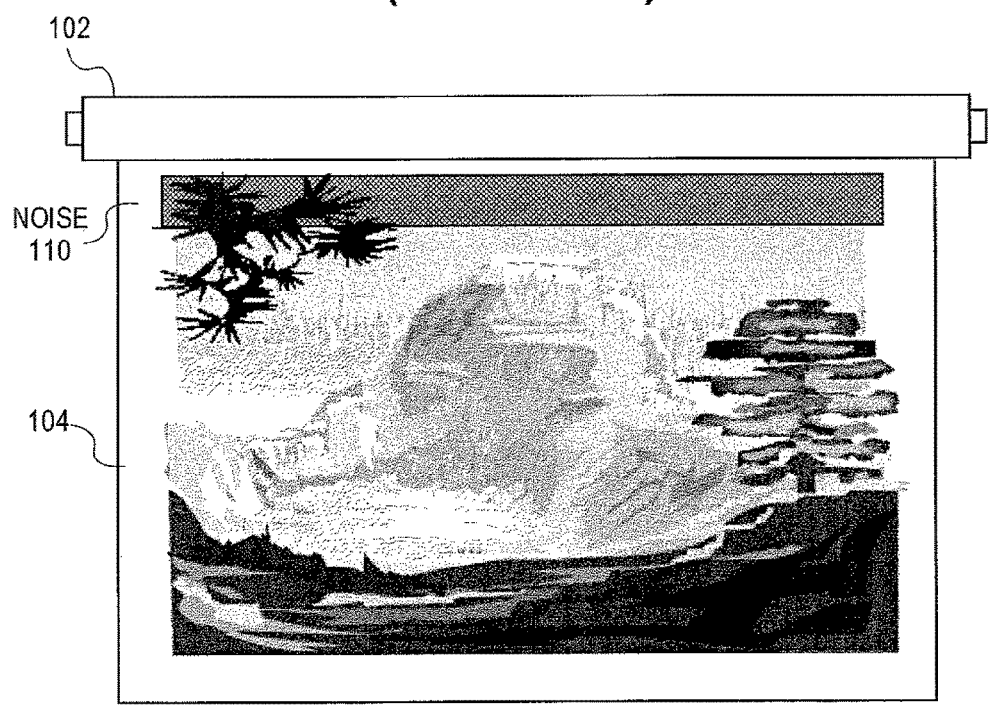
FIG. 1c is a diagram illustrating a traditional method of overscaning and displaying a video image.
Figure 2:
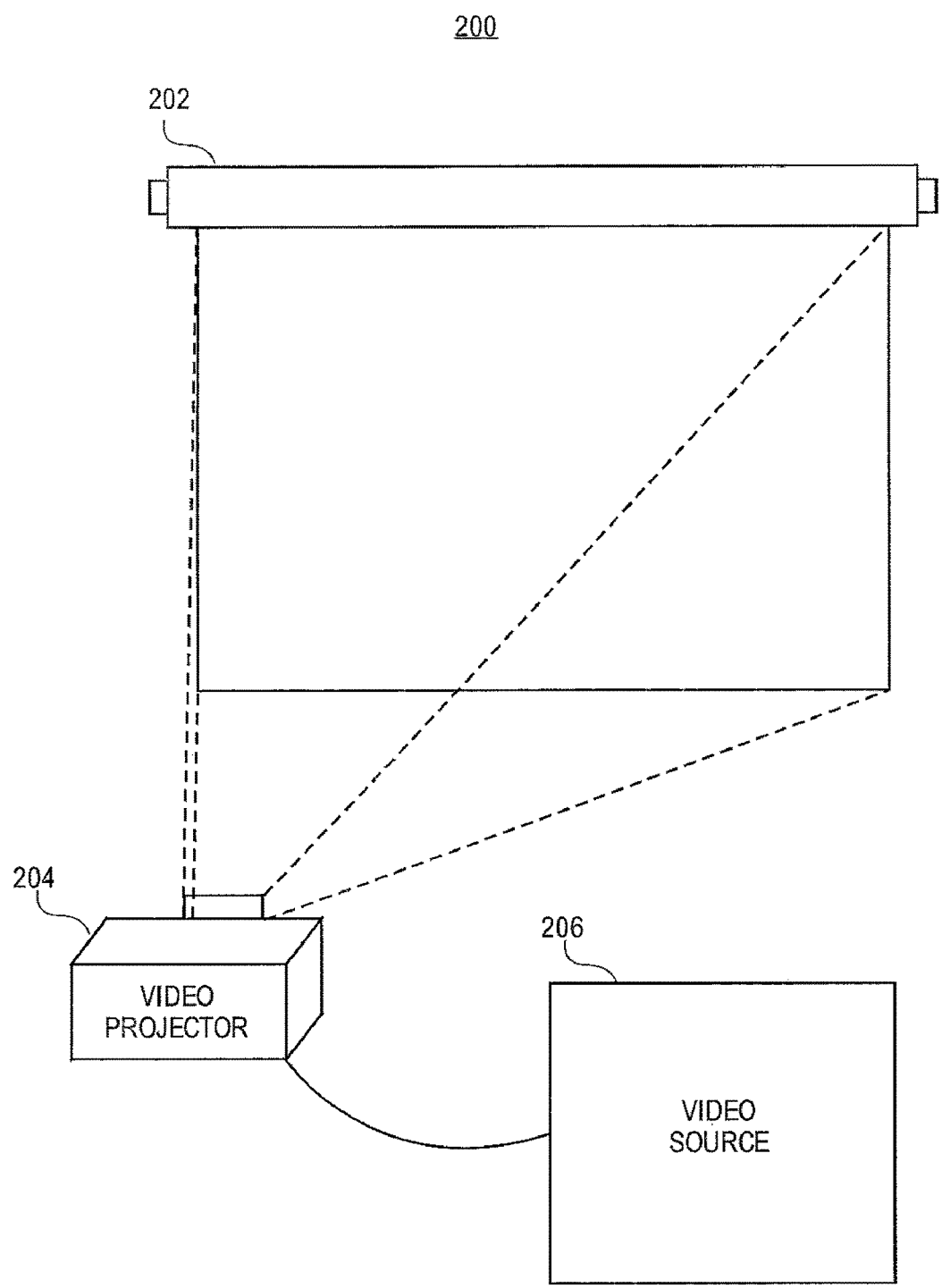
FIG. 2 is a diagram illustrating a system for displaying a video consistent with aspects of the present invention.

FIG. 2 illustrates a system 200 for displaying video consistent with aspects of the present invention. System 200 includes a display screen 202 for viewing video projected from a video projector 204. Display screen 202 may be a screen which is resizable or a fixed size screen. For example, display screen 202 may be a retractable projector screen, or a viewing screen for a rear projection television or front projection television. System 200 further includes a video source 206 which transmits a video signal to video projector 204. The video projected onto display screen 202 may be moving video or still images. Video projector 204 may be any type of video projector capable of receiving a video signal and converting the video signal to a viewable image to be displayed on display screen 202. For example, video projector 204 may be a DLP video projector, a LCD video projector, or CRT projector.

FIG. 2 illustrates video projector 204 located in front of display screen 202. As such, video is projected onto display screen 202 from the front of display screen 202. Nonetheless, one skilled in the art will realize that video projector 204 may be position behind display screen 202. As such, video is projected onto display screen 202 from behind display screen 202.

Figure 3A:
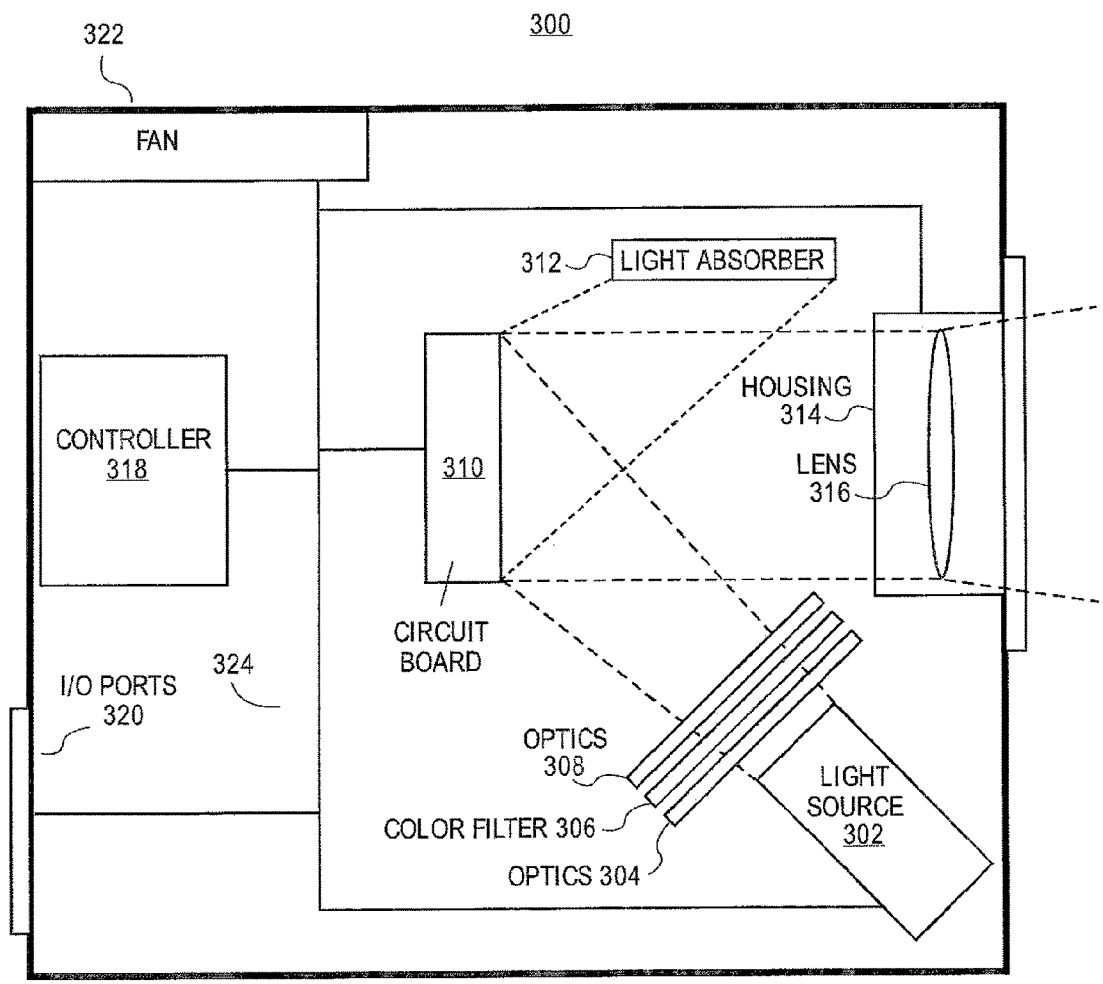
FIG. 3a is a diagram illustrating a DLP video projector consistent with aspects of the present invention.

FIG. 3a illustrates an exemplary DLP video projector 300 which may be used as video projector 204. DLP video projector 300 is an example of one type of projector which may be used with system 200. One skilled in the art will understand that any type of video projector may be used with system 200 such as a GIRT projector or an LCD projector.

DLP video projector 300 may include a controller 318 and a bus 324. Controller 318 may include components to control and monitor DLP video projector 300. For example, controller 318 may include a processor, non-volatile memory, and mass storage. All the components of DLP video projector 300 may be coupled to bus 324 to allow all the components to communicate with controller 318 and one another. DLP video projector 300 includes a fan 322 to cool DLP video projector 300. Fan 322 may be coupled to bus 324. DLP video projector 300 also includes a power supply (not shown) coupled to all the components.

DLP video projector 300 contains a light source 302 for generating light to produce a video image. Light source 302 may be, for example, an ultra-high performance ("UHP") lamp capable of producing from 50-500 watts of power. Light source 300 may be coupled to bus 324 to communicate with other components. For example, controller 318 or DLP circuit board 310 may control the brightness of light source 302.

Light generated by light source 302 passes though optics 304, 308 and color filter 306. Optics 304 and 308 may be, for example, a condenser and a shaper, respectively, for manipulating the light generated by light source 302. Color filter 306 may be, for example, a color wheel capable of spinning at various speeds to produce various colors.

Video projector 300 also contains a DLP circuit board 310. DLP circuit board 310 may include a digital micro-mirror device, a processor, and memory. For example, DLP circuit board 310 may be a DARKCHIP2 or DARKCHIP3 DLP chip manufactured by TEXAS INSTRUMENTS. DLP circuit board 310 is coupled to bus 324 to receive the video signal received from input/output ports 320 and to communicate with controller 318. DLP circuit board 310 reflects light from light source 302 using the digital micro-mirrors and generates video based on the video signal to be displayed on video screen 202. DLP circuit board 310 reflects light not used for the video onto light absorber 312. Light reflected by DLP circuit board 310 used for the video passes through lens housing 314 and lens 316. Lens 316 focuses the video to be displayed on display screen 102. Lens housing 314 may include a manual lens moving mechanism or a motor to automatically move lens 316. The manual lens moving mechanism or motor allows the position of lens 316 and, as a result, shift the position of the video displayed on display screen 202. The shifting may be achieved by moving lens 316 in any combination of the x, y, or z directions.

DLP video projector 300 also includes input/output ports 320. Input/output ports 320 may be a single port or multiple ports. Input/output ports 320 enables DLP video projector to receive video signals, receive signals from a remote control device, and output signals to other sources. For example, input/output ports 320 may include ports as illustrated in FIG. 2 or any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 320 may include any port capable of sending or receiving an electrical signal. Input/output ports 320 are coupled to bus 324. Signals input into DLP video projector 300 may be transferred to the various components of DLP video projector 300 via bus 324. Likewise, signals output of DLP video projector 300 may be transferred to input/output ports 320 via bus 324.

Figure 3B:
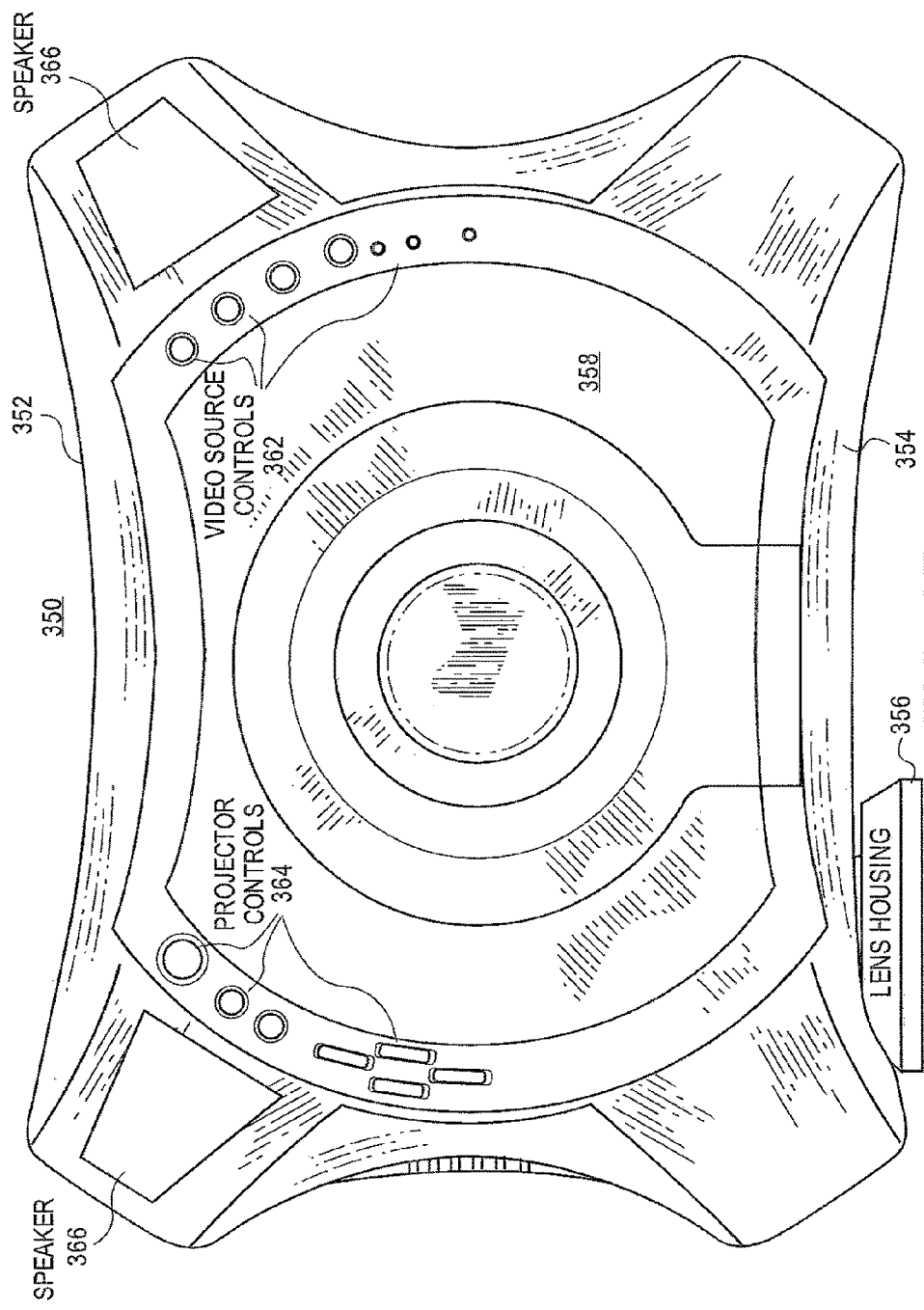
FIGS. 3b-f are various views illustrating an integrated video projector and video source consistent with aspects of the present invention.

As stated above, video source 206 may be integrated with video projector 204. FIGS. 3b-f are various views of a video projection system 350 which includes a video source and video projector integrated into a single housing 352 consistent with aspects of the present invention. Video projection system 350 may be utilized as system 204 in video system 200. FIG. 3b is a top view of video projection system 350 consistent with aspects of the present invention. As shown in FIG. 3b, video projection system 350 includes video projector 354 and a video source 358 in a single housing. For example, video projector 354 may be a DLP projector and video source 358 may be a DVD player. Video projection system 350 includes a lens housing 356 located in a front portion of video projector 354. Lens housing 356 may include various lens used in projecting video onto a display screen. Further, video source 358 includes a tray 360 for housing media read by video source 358. For example, if video source 358 is a DVD player, tray 360 may house DVD discs.

Further, as illustrated in FIG. 3b, video projection system 350 includes projector controls 362 for operating video projector 354. For example, projector controls 362 may be a power switch, zoom controls, input/output select controls, and picture mode controls. Video projection system 350 also includes video source controls 364. For example, video source controls 364 may be tray open/close controls, play/stop controls, and video search controls for operating video source 358. Video projection system 350 may also be controlled by a remote device (not shown). For example, a remote device may include redundant projector controls 362 and video source controls 364. Video projection system 350 also includes speakers 366 for presenting sounds corresponding to video generated by video projection system 350.

Figure 3C:
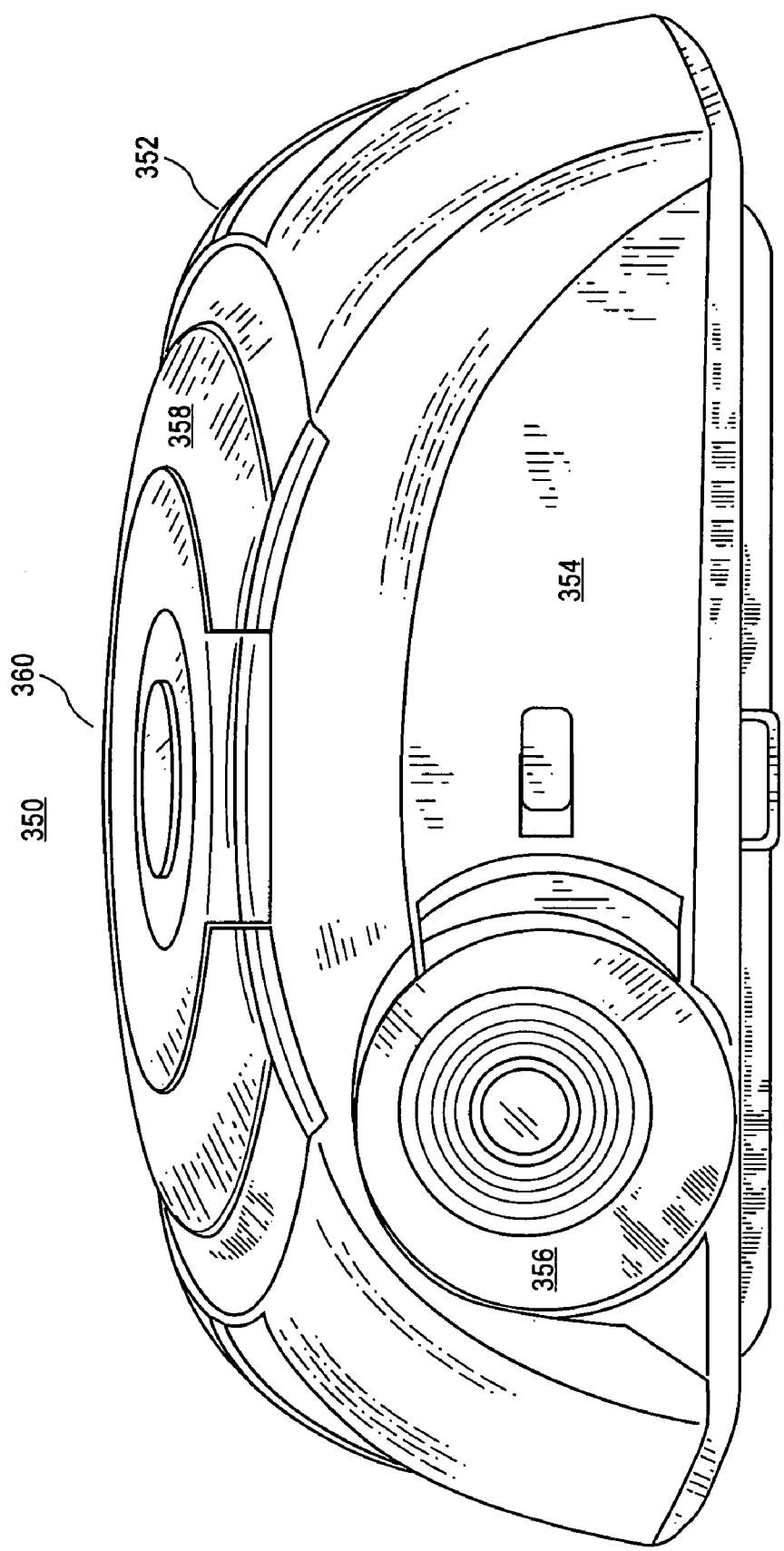
Figure 3D:
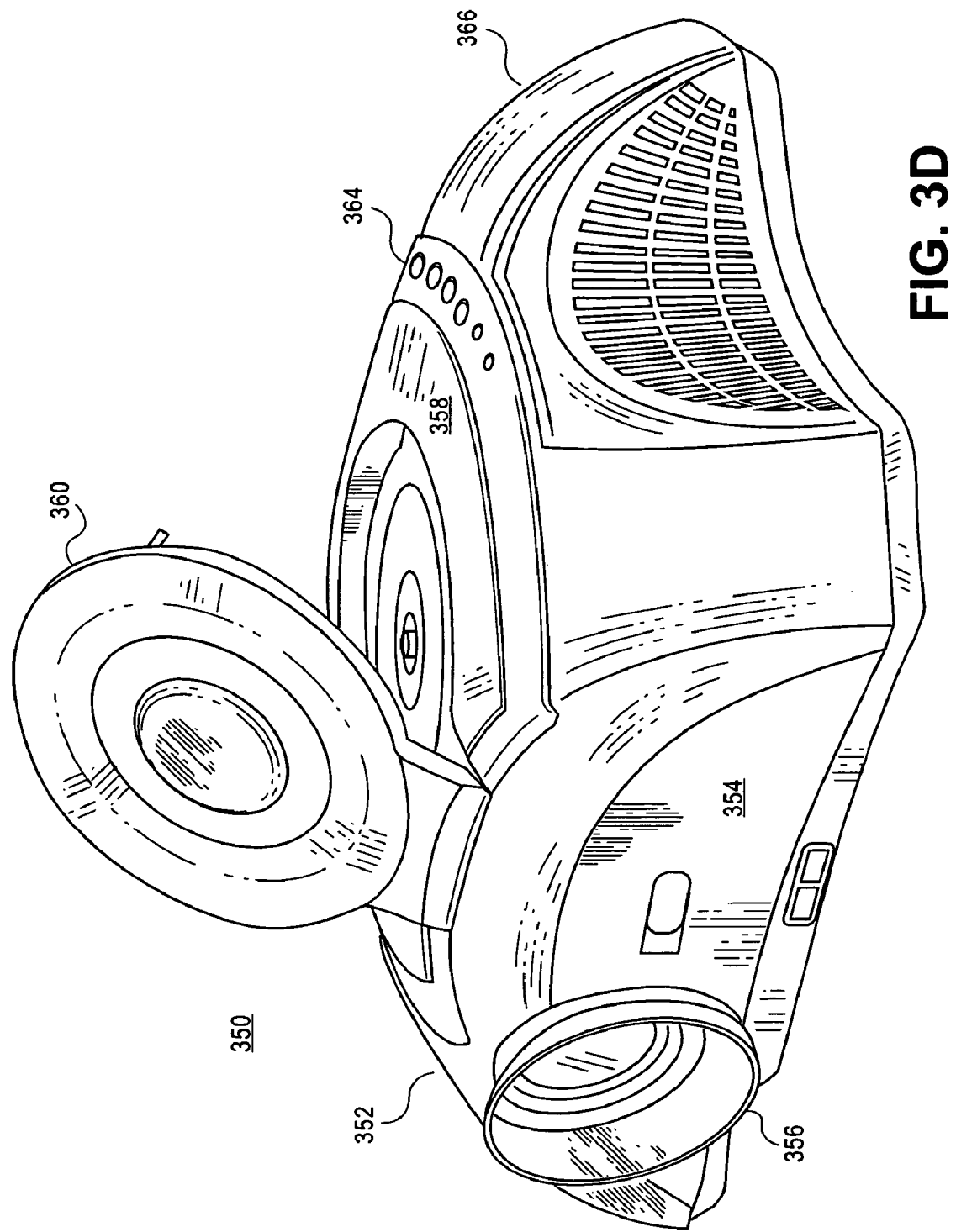

FIG. 3c is a front view of video projection system 350. As shown in FIG. 3c, lens housing 356 is located in the front portion of housing 352 of video projection system 350. Further, video source 358 and tray 360 may be housed in the top portion of housing 352 of projection system 350. FIG. 3d is another front view of video projection system 350. FIG. 3d illustrates video projection system 350 when tray 360 is open for inserting media to be played by video source 358.

Figure 3E:
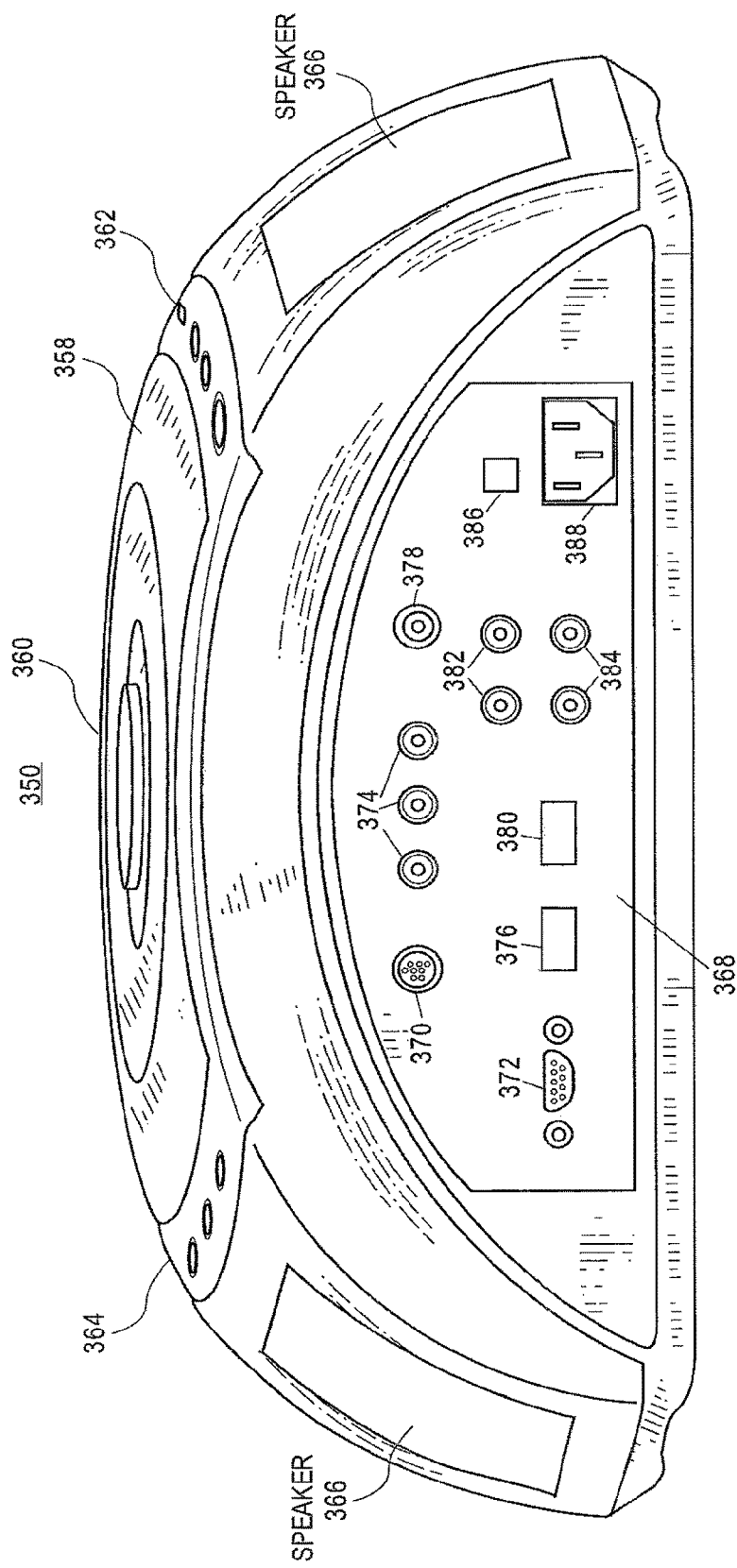

FIG. 3e is a rear view of video projection system 350. As illustrated in FIG. 3e, input/output ports 368 are located in a rear portion of housing 352 of video projection system 350. For example, input/output ports 368 may include an S-video input 370, DVI-I input 372, component video input 374, VGA input 376, composite video input 378, RS-232 port 380, audio input 382, audio output 384, and optical audio output 386, and power input 388. Input/output ports 368 may include additional input and output ports (not shown). For example, input/output ports 368 may include ports any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 368 may include any port capable of sending or receiving an electrical signal.

Further, as illustrated in FIG. 3e, speakers 366 are located in the sides of the rear portion of housing 352 of video projection system 350. Of course, speakers 366 may also be located in other portions of housing 352. In addition, video projection system 350 may be coupled to other speakers (not shown) that are external to housing 352.

Figure 3F:
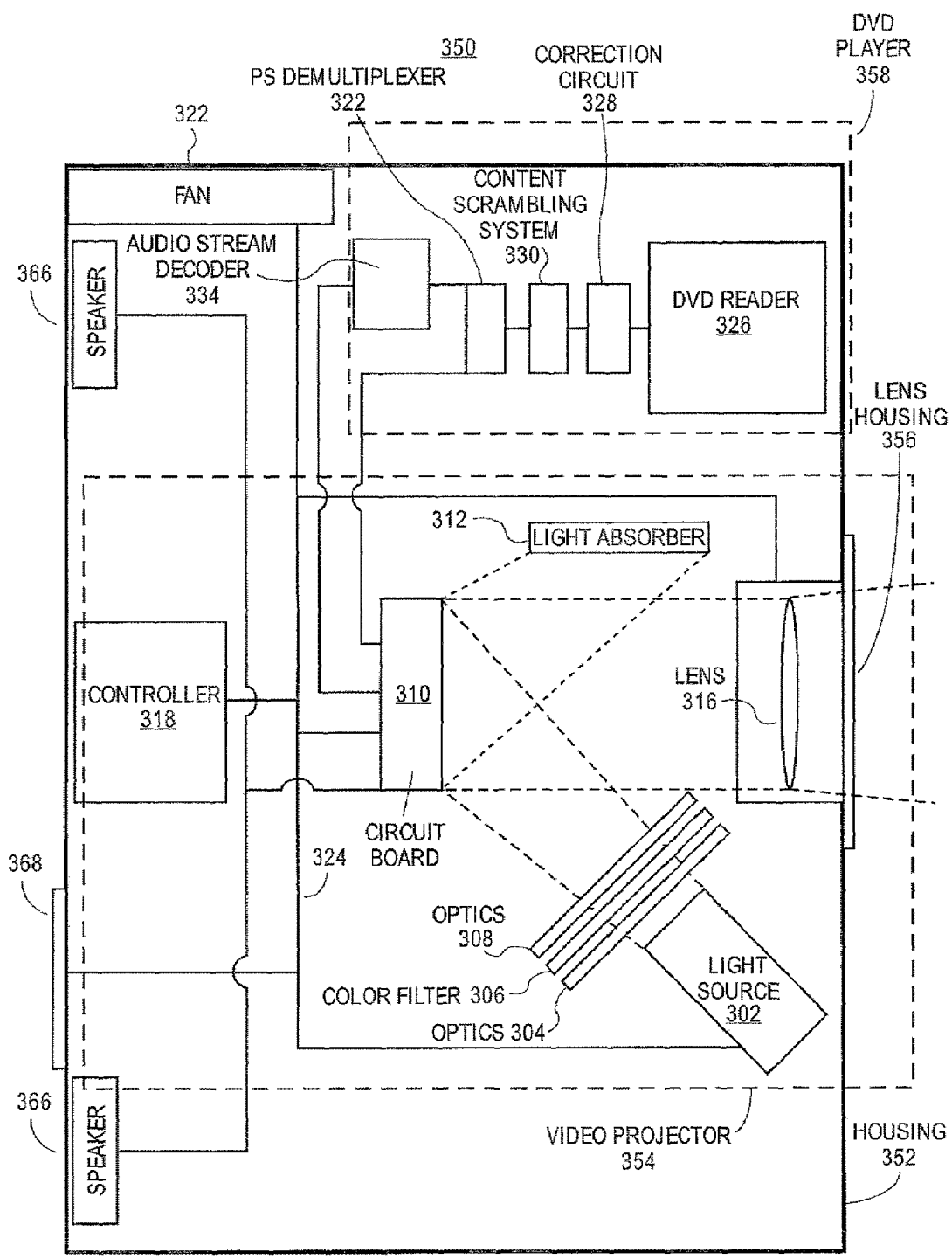

FIG. 3f is a block diagram illustrating internal components of video projection system 350 consistent with aspects of the present invention. As illustrated in FIG. 3f, video projection system 350 includes a DLP video projector 354 and a DVD player 358 integrated into a single housing 352. DLP video projector 354 is an example of one type of projector which may be used with video projection system 350. One skilled in the art would understand that any type of video projector may be used with video projection system 350 such as a CRT projector or an LCD projector. Further, DVD player 358 is an example of one type of video source which may be used with video projection system 350. One skilled in the art will understand that any type of video source may be used with video projection system 350.

DLP video projector 354 may include a controller 318 and a bus 324. Controller 318 may include components to control and monitor DLP video projector 354. For example, controller 318 may include a processor, non-volatile memory, and mass storage. All the components of DLP video projector 354 may be coupled to bus 324 to allow all the components to communicate with controller 318 and one another. DLP video projector 354 includes a fan 322 to cool DLP video projector 354. Fan 322 may be coupled to bus 324. DLP video projector 354 also includes a power supply (not shown) coupled to all the components.

DLP video projector 354 contains a light source 302 for generating light to produce a video image. Light source 302 may be, for example, an UHP lamp capable of producing from 50-500 watts of power. Light source 300 may be coupled to bus 324 to communicate with other component. For example, controller 318 or DLP circuit board 310 may control the brightness of light source 302.

Light generated by light source 302 passes though optics 304, 308 and color filter 306. Optics 304 and 308 may be, for example, a condenser and a shaper, respectively, for manipulating the light generated by light source 302. Color filter 306 may be, for example, a color wheel capable of spinning at various speeds to produce various colors.

DLP projector 354 also contains a DLP circuit board 310. DLP circuit board 310 may include a digital micro-mirror device, a processor, and memory. For example, DLP circuit board 310 may be a DARKCHIP2 or DARKCHIP3 DLP chip manufactured by TEXAS INSTRUMENTS. DLP circuit board 310 is coupled to bus 324 to receive the video signal received from input/output ports 320 and to communicate with controller 318. DLP circuit board 310 reflects light from light source 302 using the digital micro-mirrors and generates video based on the video signal to be displayed on display screen 202. DLP circuit board 310 reflects light not used for the video onto light absorber 312. Light reflected by DLP circuit board 310 used for the video passes through lens housing 356 and lens 316. Lens 316 focuses the video to be displayed on display screen 202. Lens housing 356 may include a manual lens moving mechanism or a motor to automatically move lens 316. The manual lens moving mechanism or motor allows the position of lens 316 and, as a result, shift the position of the video displayed on display screen 202. The shifting may be achieved by moving lens 316 in any combination of the x, y, or z directions.

DLP video projector 354 also includes input/output ports 368. Input/output ports 368 may be a single port or multiple ports. Input/output ports 368 enables DLP video projector 354 to receive video signals, receive signals from a remote control device, and output signals to other sources. For example, input/output ports 368 may include ports as illustrated in FIG. 3e or any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 368 may include any port capable of sending or receiving an electrical signal. Input/output ports 368 are coupled to bus 324 and to audio bus 336. Signals input into DLP video projector 354 may be transferred to the various components of DLP video projector 354 via bus 324. Likewise, signals output of DLP video projector 354 may be transferred to input/output ports 368 via bus 324.

DLP video projector 354 also includes DVD player 358. DVD player 358 is composed DVD reader 326. DVD reader 326 may include a spindle motor for turning a DVD disc, a pickup head, and a head amplifier equipped with an equalizer. DVD reader 326 is coupled to a decoder/error correction circuit 328, a content scrambling system 330 for copy protecting DVD contents, a program stream demultiplexer ("PS demultiplexer") 332.

DVD player reads a DVD disc with DVD reader 326 by emitting laser light from the pickup head in order to irradiate the DVD disc with a predetermined wavelength. The reflected light is converted to an electric signal which is then output to the head amplifier. The head amplifier serves to perform signal amplification, waveform shaping and digitization while decoder/error correction circuit 328 serves to perform 8-16 decoding and error correction. Next, content scrambling system 330 performs mutual authentication of the DVD disc and DVD player 358 in order to confirm the authorization.

When the authorization is successfully finished, PS demultiplexer 332 separates the program stream ("PS") as read from the DVD disc into sound and video data in the form of packetized elementary streams ("PES"). Audio stream decoder 334 decodes the PES sound stream with sound compression encoding technology in order to output audio signals. For example, audio stream decoder may utilize sound compression formats such as AAC, AC3, and MPEG. DLP circuit board 310 decodes and processes the video PES which would include video, sub-picture, and navigation data. For example, DLP circuit board 310 may utilize video compression formats such as MPEG 2. The decoded sound stream is transferred to DLP circuit board 310 and DLP circuit board 310 synchronizes sounds; which is transferred to speakers 366 via sound bus 336 and video, which is generated by DLP video projector 354.

One skilled in the art will realize that controller 318 may be utilized in combination with DLP circuit board 310 for producing video and sound from DVD player 358. Further, DLP circuit board 310 or controller 318 may perform audio decoding functions similar to the functions as performed by audio stream decoder 334.

Figure 4A:
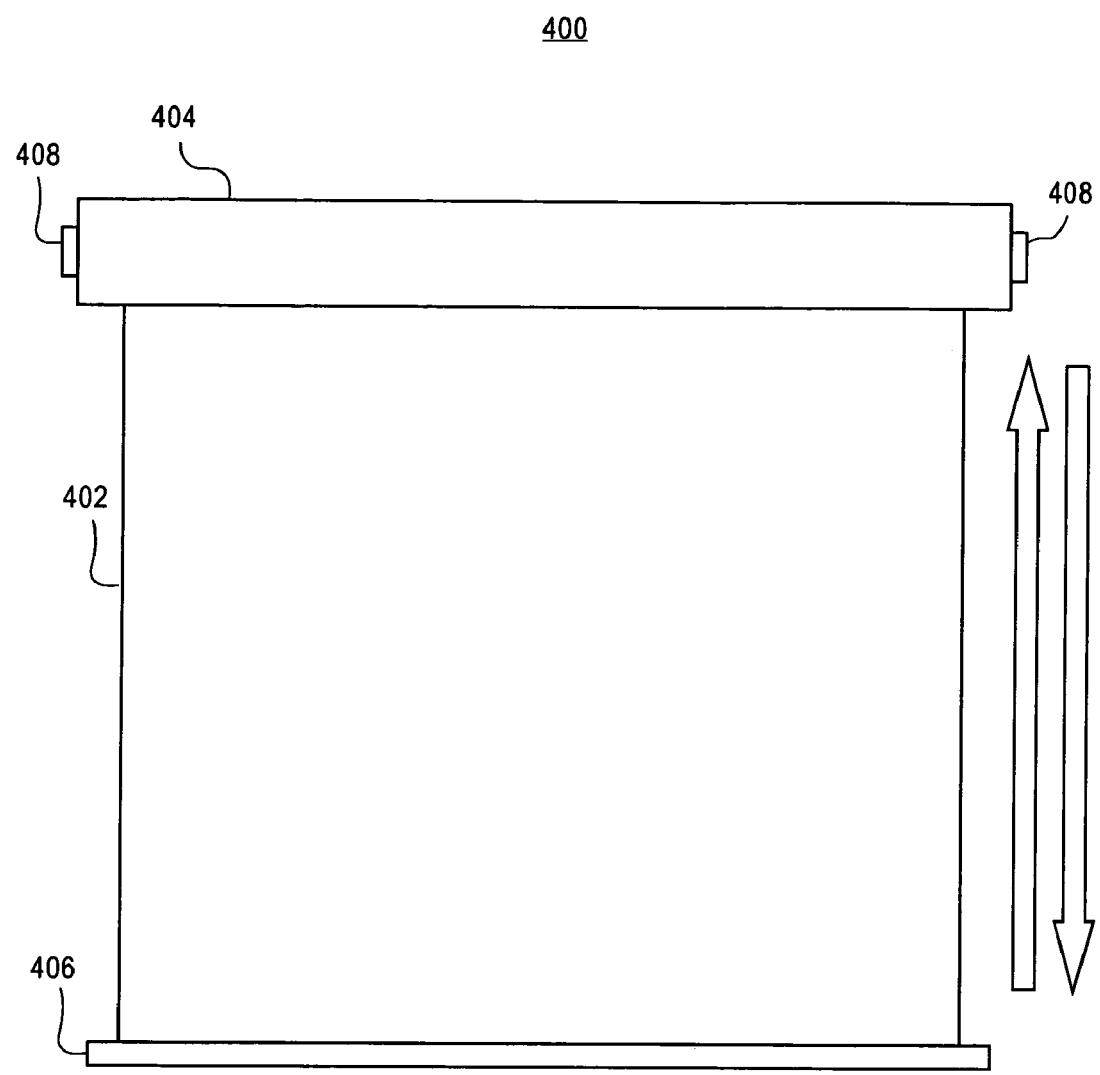
FIGS. 4a and 4b are diagrams illustrating display screens consistent with aspects of the present invention.

FIG. 4a illustrates a detailed view of display screen 400 which may be used as display screen 202 consistent with aspects of the present invention. Display screen 400 is merely an example of one type of display screen which may be used with system 200. One skilled in the art would understand that any type of display screen capable of displaying an image may be used with system 200. Display screen 400 includes a viewing screen 402 that retracts into a housing 404. Viewing screen 400 may be constructed of materials that efficiently reflect the video projected from video projector 204. For example, viewing screen 404 may be constructed of a white or gray vinyl fabric, glass beaded fabric, VIDEO SPECTRA fabric, High Contrast fabric, or High Power fabric. One skilled in the art would realize that the above materials are exemplary and that viewing screen 402 may be constructed of any material or combination of materials that reflects light. Optionally, a weight 406 is attached to the bottom of viewing screen 402 to stabilize viewing screen 402.

Display screen 400 also includes mounting brackets 408 which enable display screen 400 to be attached to a wall or ceiling. FIG. 4 illustrates mounting brackets 408 as located on the sides of housing 404. Mounting brackets 408 may be located on any surface of housing 404 to facilitate the mounting of display screen 400.

Viewing screen 402 may be manually or electrically retracted into housing 404. If viewing screen 402 is manually retracted, housing 404 contains an inertial locking mechanize and roller (not shown) attached to viewing screen 402. The inertial locking mechanize enables a user to apply force to viewing screen 402 in order to retract or extend viewing screen 402. As the viewing screen 402 retracts, viewing screen 402 is wound around the roller.

If viewing screen 402 is electrically retracted, housing 404 contains an electrical motor and roller (not shown) attached to viewing screen 404. To electrically operate viewing screen 402, current is supplied to the electrical motor to activate the motor and wind viewing screen 402 around the roller in order to retract or extend viewing screen 402 into housing 402. The current supplied to the electrical motor may be controlled by a switch (not shown) located on housing 404. Additionally, a wireless receiver (not shown) may be attached to the electrical motor to enable the electrical motor to be controlled remotely. Additionally, a memory may be attached to the motor in order to store different viewing screen positions to be recalled when needed.

Figure 4B:
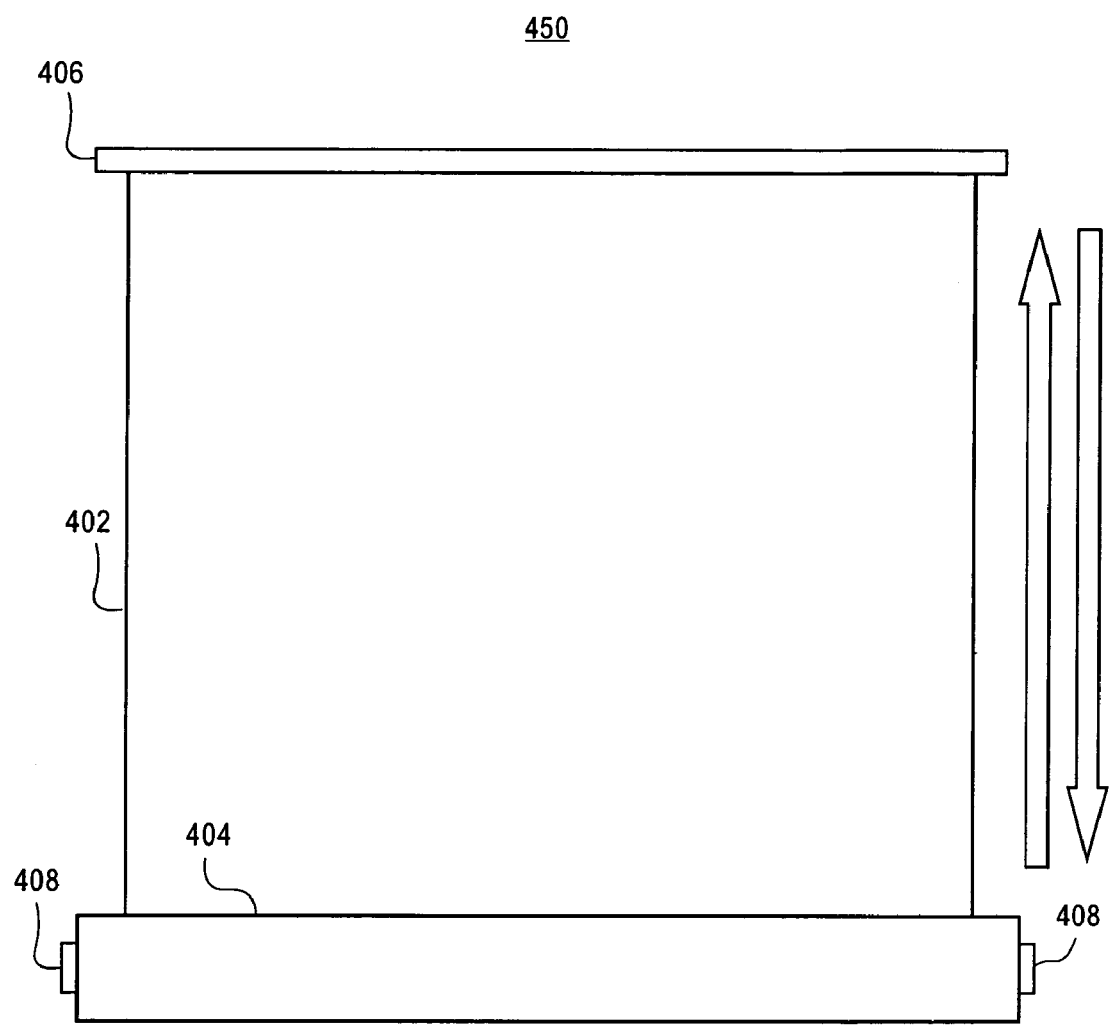

FIG. 4b is a diagram illustrating a display screen 450 which may be used as display screen 202 consistent with aspects of the present invention. Display screen 450 includes a viewing screen 402, a housing 404, an optional weight 406, and optional mounting brackets 408 as display screen 400. Display screen 450 functions in the same manner as display screen 400 except that viewing screen 402 extends upward out of housing 404. Display screen 450 is merely an example of one type of display screen which may be used with system 200.

Figure 5:
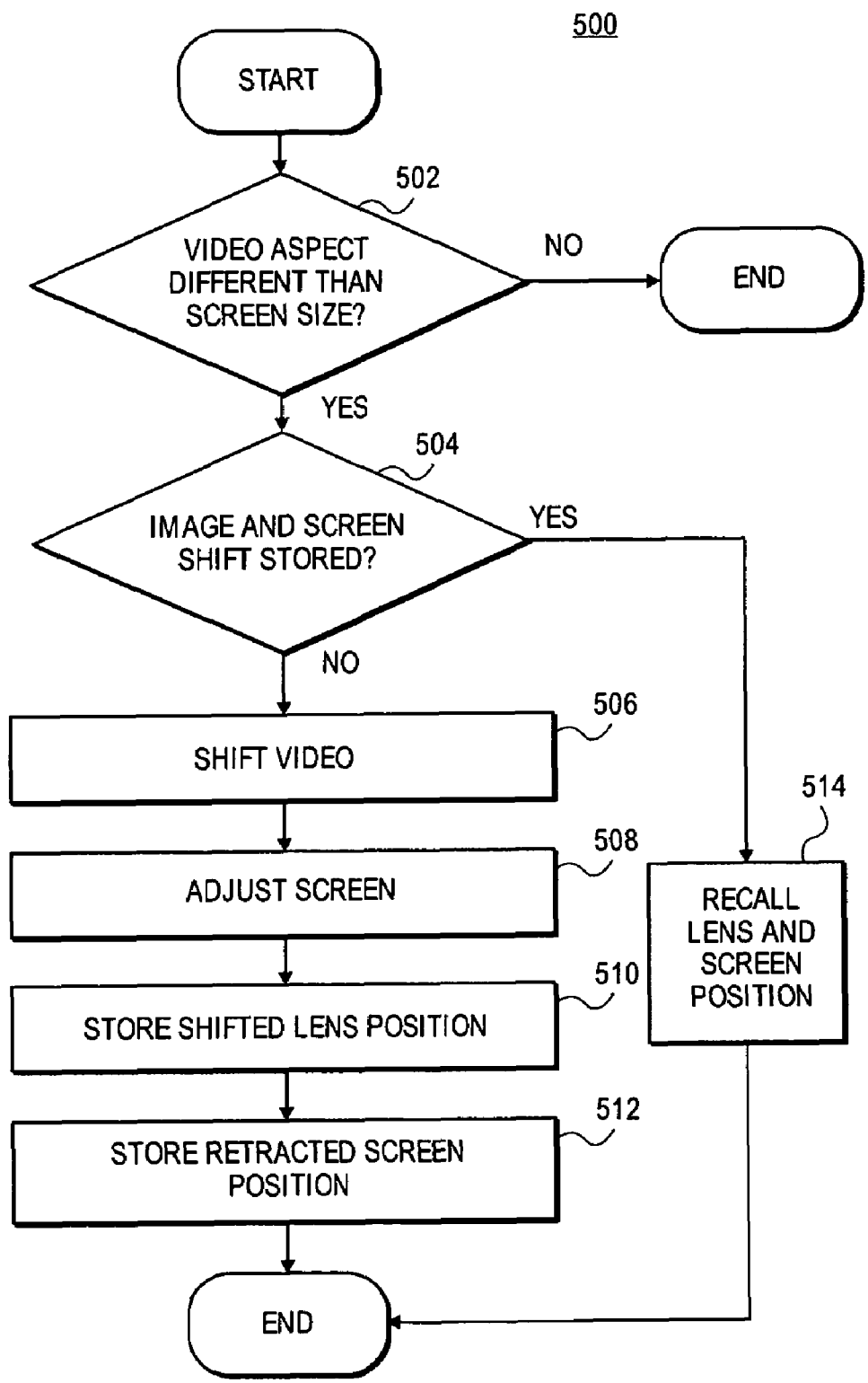
FIG. 5 is a flow chart illustrating a method for displaying video with different aspect ratios consistent with aspects of the present invention.
Figure 6A:
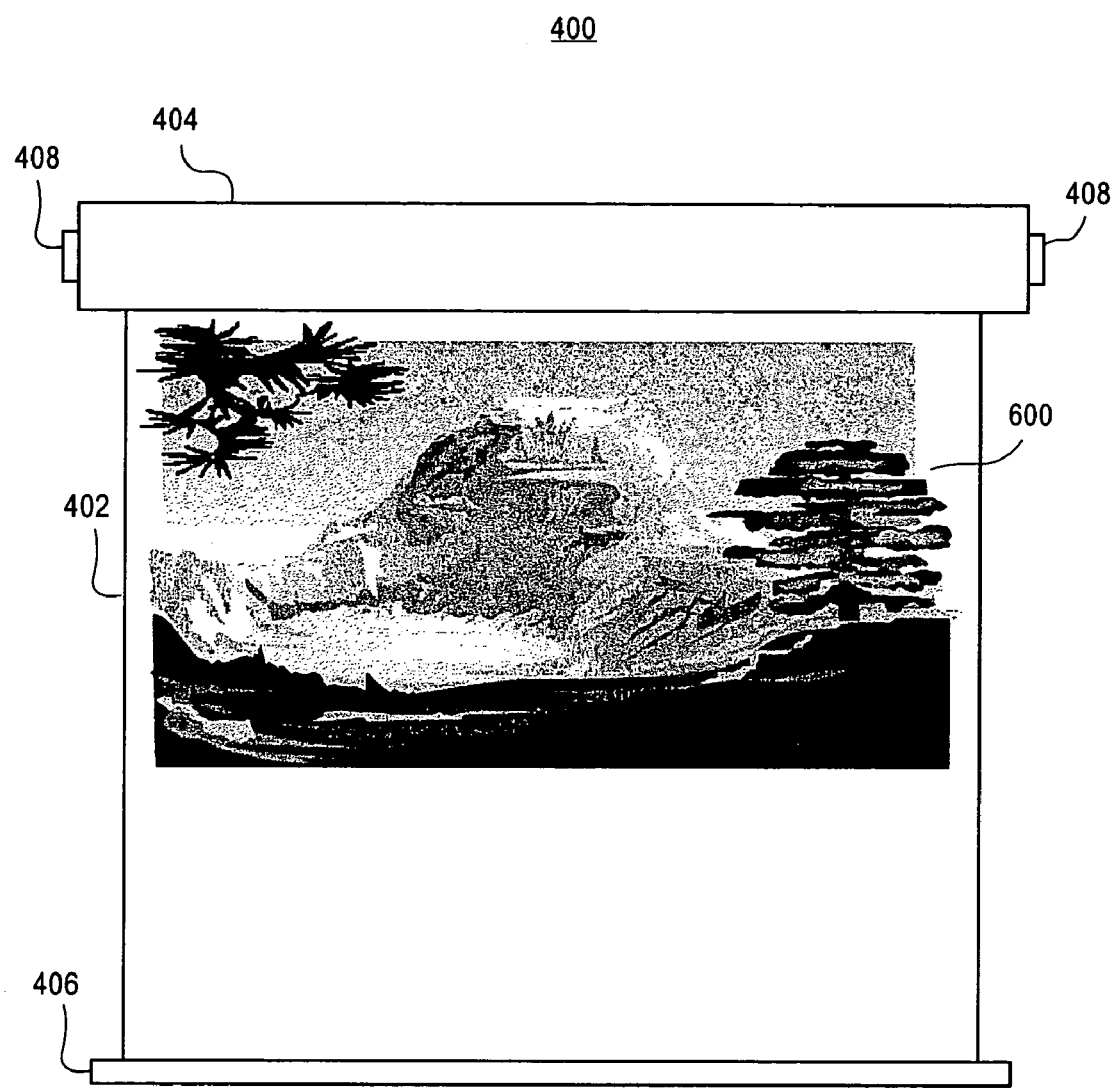
FIGS. 6a and 6b are diagrams illustrating a method for displaying video with different aspect ratio consistent with aspects of the present invention.
Figure 6B:
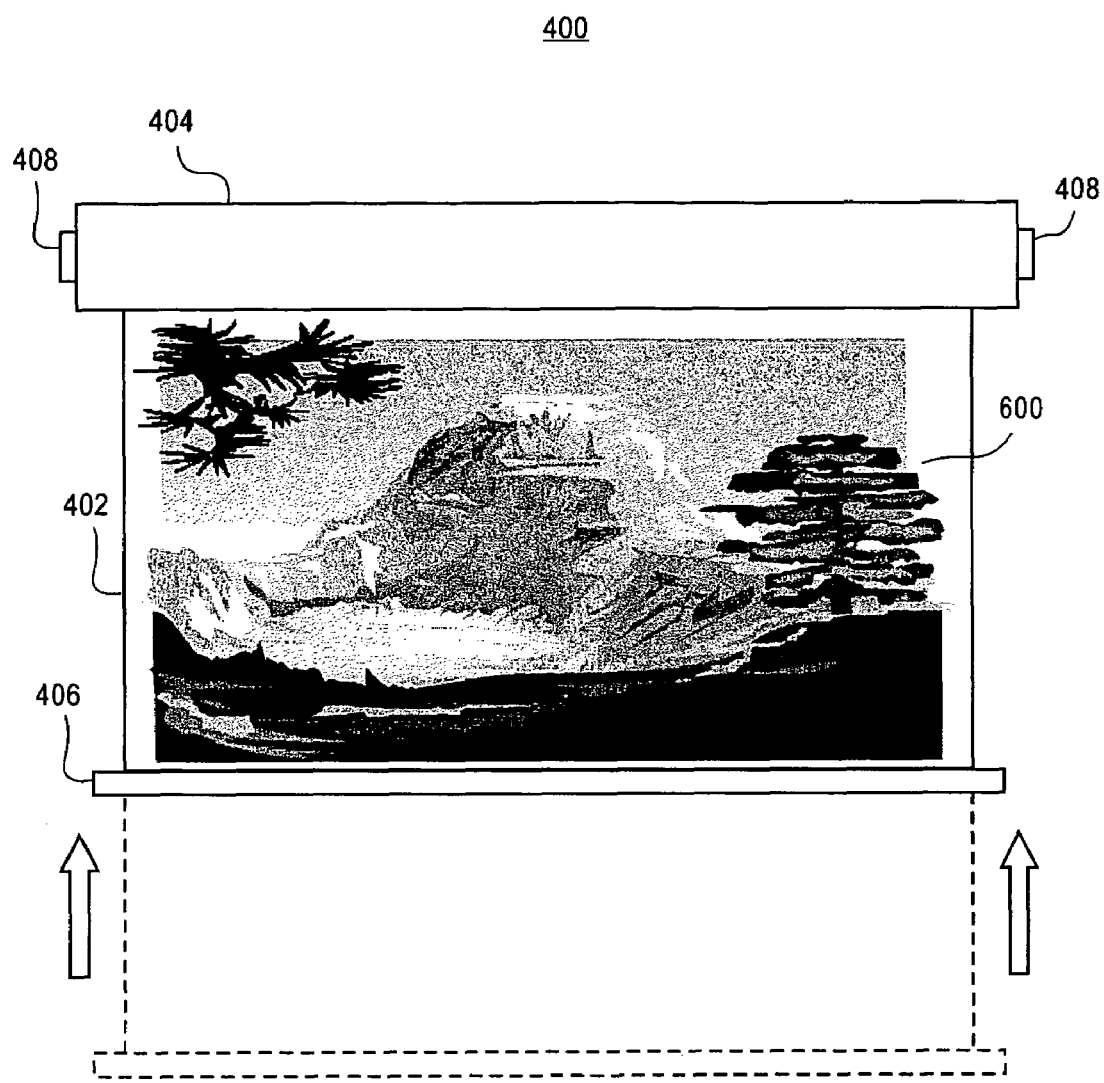

FIGS. 5, 6a, and 6b illustrate a method 500 for displaying video utilizing a system 200 consistent with aspects of the present invention. FIG. 5 is a flow chart illustrating the stages in method 500 for displaying images consistent with aspects of the present invention. First, video is projected on display screen 400 to determine if the aspect ratio of the video is different from the dimensions of viewing screen 402 (stage 502). One skilled in the art will realize that display screen 400 is exemplary and that method 500 may be used with any front projection or rear projection display screen. For example, the video may be in a widescreen aspect ratio and viewing screen 402 may be in a 3:2 aspect ratio. If the video's aspect ratio matches the dimensions of viewing screen 402, no adjustment to the video's position or screen size is necessary. If the video's aspect ratio does not match the dimensions of viewing screen 402, it is determined whether a shifted video position and screen position has been previously stored in memory (stage 504).

If a shifted video position has not been stored, the video image and viewing screen may be shifted to match the aspect ratio. First, video projector 204 shifts the video to down from the top portion of viewing screen 402 (stage 506). Video projector 204 shifts the video by moving a lens inside of video projector 204. For example, if DLP video projector 300 is used, lens 316 inside lens housing 314 is shifted. FIG. 6a illustrates the video shift in method 500 consistent with aspects of the present invention. As shown in FIG. 6a, video projector 204 projects video 600 down so that it is aligned with the top of viewing screen 402 near housing 404.

Next, viewing screen 402 is retracted into housing 404 until the bottom of viewing screen 402 is aligned with the bottom of the video (stage 508). If viewing screen 402 is manually operated, a user may apply force to viewing screen 402 until the bottom edge of viewing screen 402 is aligned with the bottom of the video. If viewing screen 402 is electrically operated, viewing screen 402 may be retracted using a switch located on display screen 400 or a remote in communication with display screen 400. FIG. 6b illustrates a change in position of viewing screen 402 in method 500 consistent with aspects of the present invention. As shown in FIG. 6b, viewing screen 402 is retracted until the bottom edge of viewing screen 402 is aligned with the bottom of video 600.

Once the video has been shifted to the top portion of viewing screen 402, the shifted lens position may be stored in memory in video projector 204 (stage 510). For example, if DLP video projector 300 is being utilized, the shifted position of lens 314 may be stored in the non-volatile memory in controller 318 or in the memory contained on DLP circuit board 310. Additionally, if display screen 400 is electrically operated, the retracted position of viewing screen 250 may be stored in memory located in housing 404 (stage 512). Once the shifted lens position or the retracted position of viewing screen 402 is stored in memory, the video and viewing screen may be easily adjusted to match the aspect ratio of the video next time video projector 204 generates video (stage 514).

Additionally, the shifted lens position and the retracted position of viewing screen 402 may be stored in the same memory. For example, the shifted position of lens 316 and the retracted position of viewing screen 402 may be stored in the non-volatile memory in controller 318 or the memory of DLP circuit board 310. Accordingly, when the shifted position of lens 316 and retracted position of viewing screen 402 are recalled (stage 514), controller 318 may communicate the retracted position of viewing screen 402 to display screen 400 via input/output ports 320.

Figure 7:
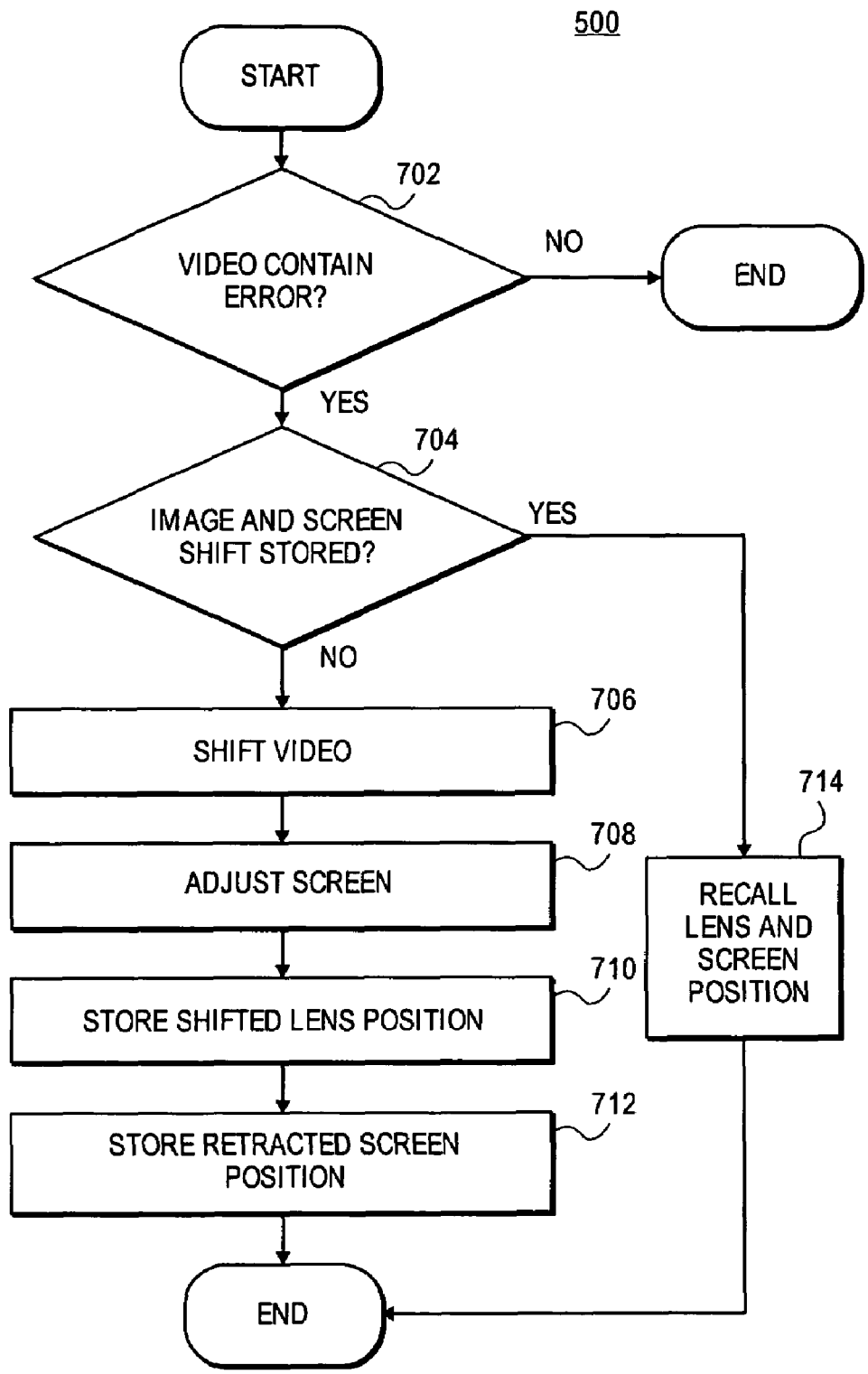
FIG. 7 is a flow chart illustrating a method for displaying video, which includes error, consistent with aspects of the present invention.
Figure 8A:
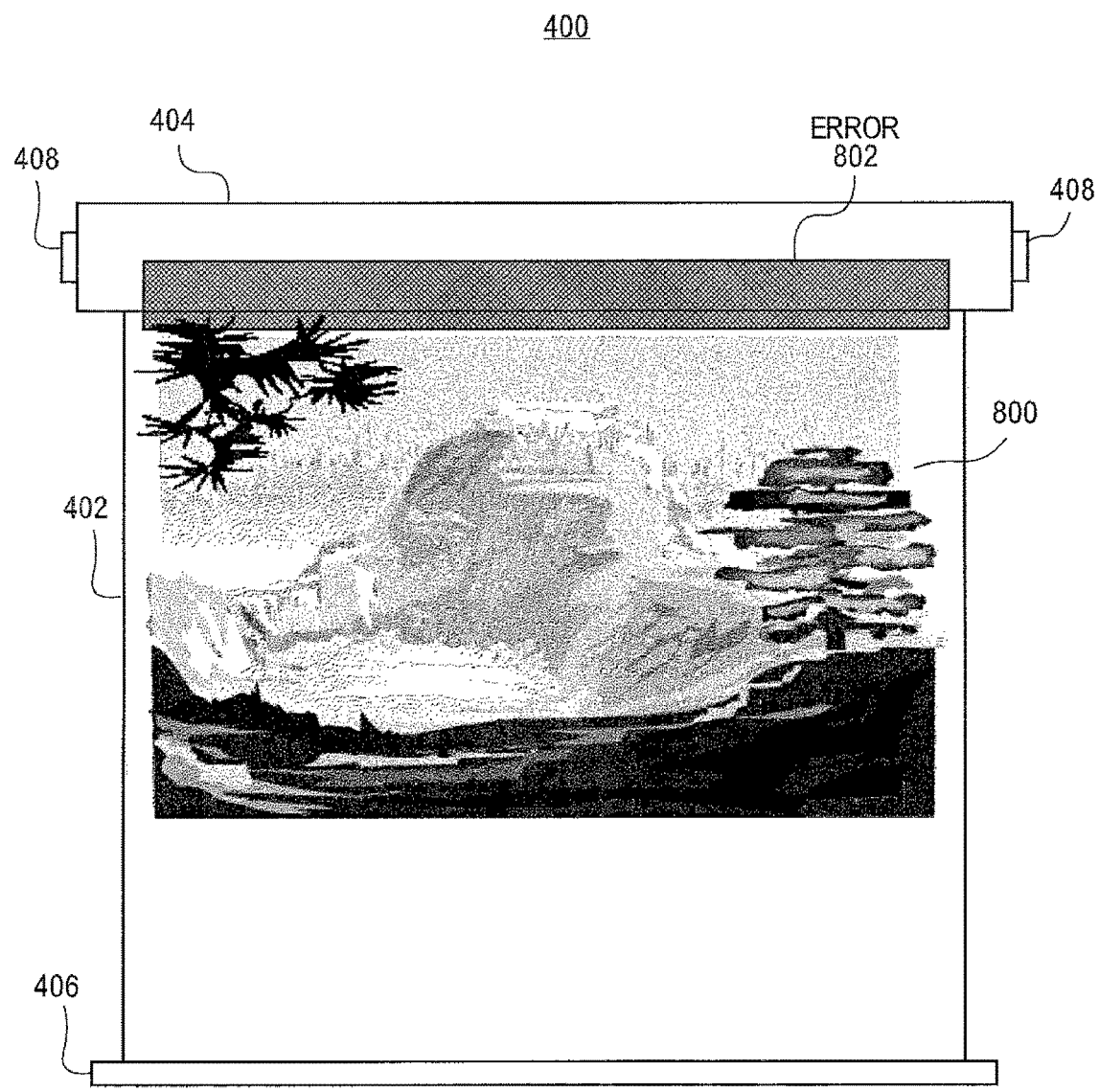
FIGS. 8a-c are diagrams illustrating a method for displaying video, which includes error, consistent with aspects of the present invention.
Figure 8B:
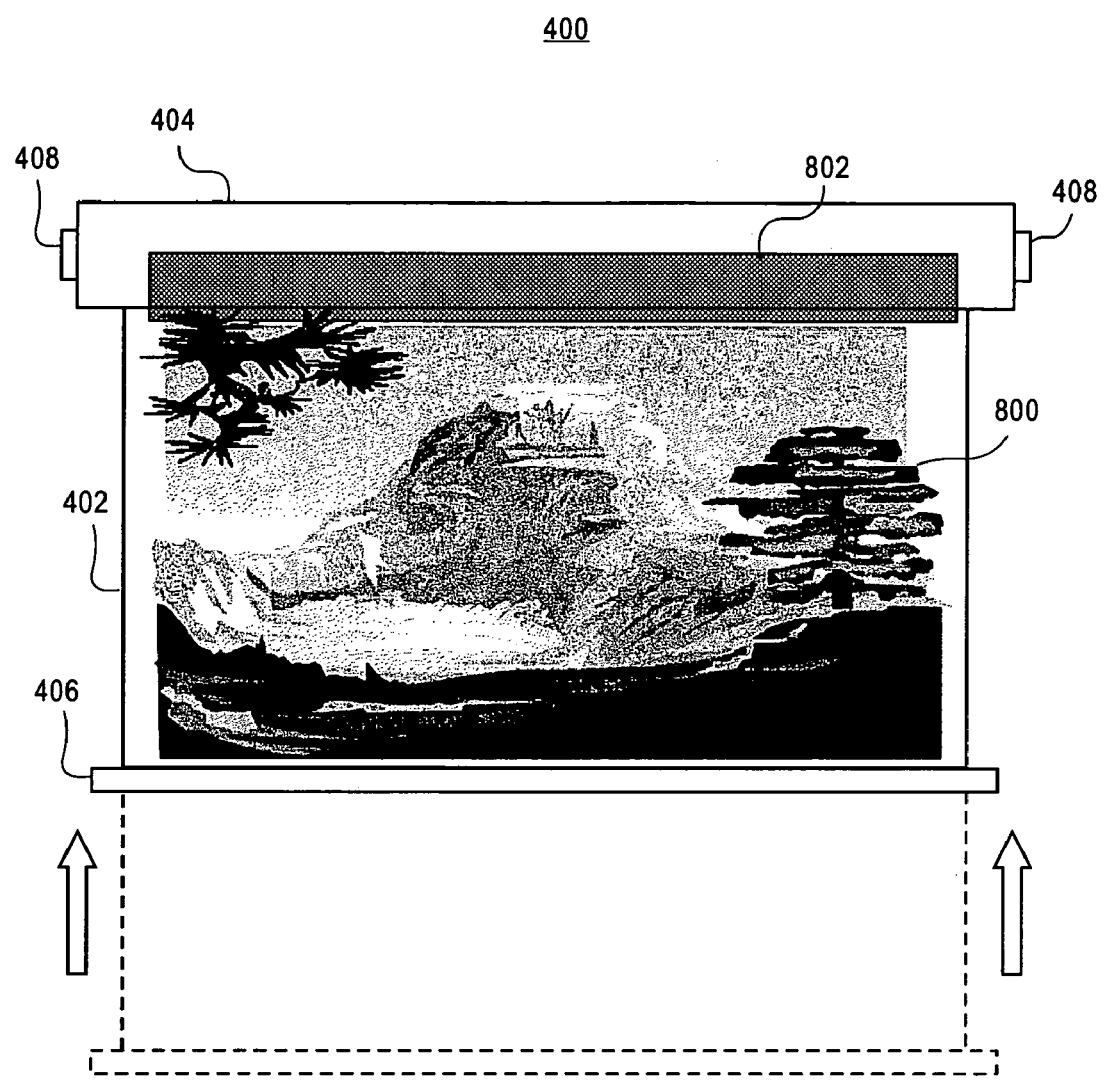

FIGS. 7, 8a, and 8b illustrate a method 700 for displaying video utilizing a system 200 consistent with aspects of the present invention. FIG. 7 is a flow chart illustrating the stages in method 700 displaying images, which include errors, consistent with aspects of the present invention. First, video is projected on display screen 400 to determine if the video contains error at the top of the video (stage 702). One skilled in the art will realize that display screen 400 is exemplary and that method 700 may be used with any front projection or rear projection display screen. If the video does not contain error, no adjustment to the video's position or screen size is necessary. If the video does contain error, it is determined whether a shifted video position and screen position to hide the error has been stored in memory (stage 704).

Figure 8C:
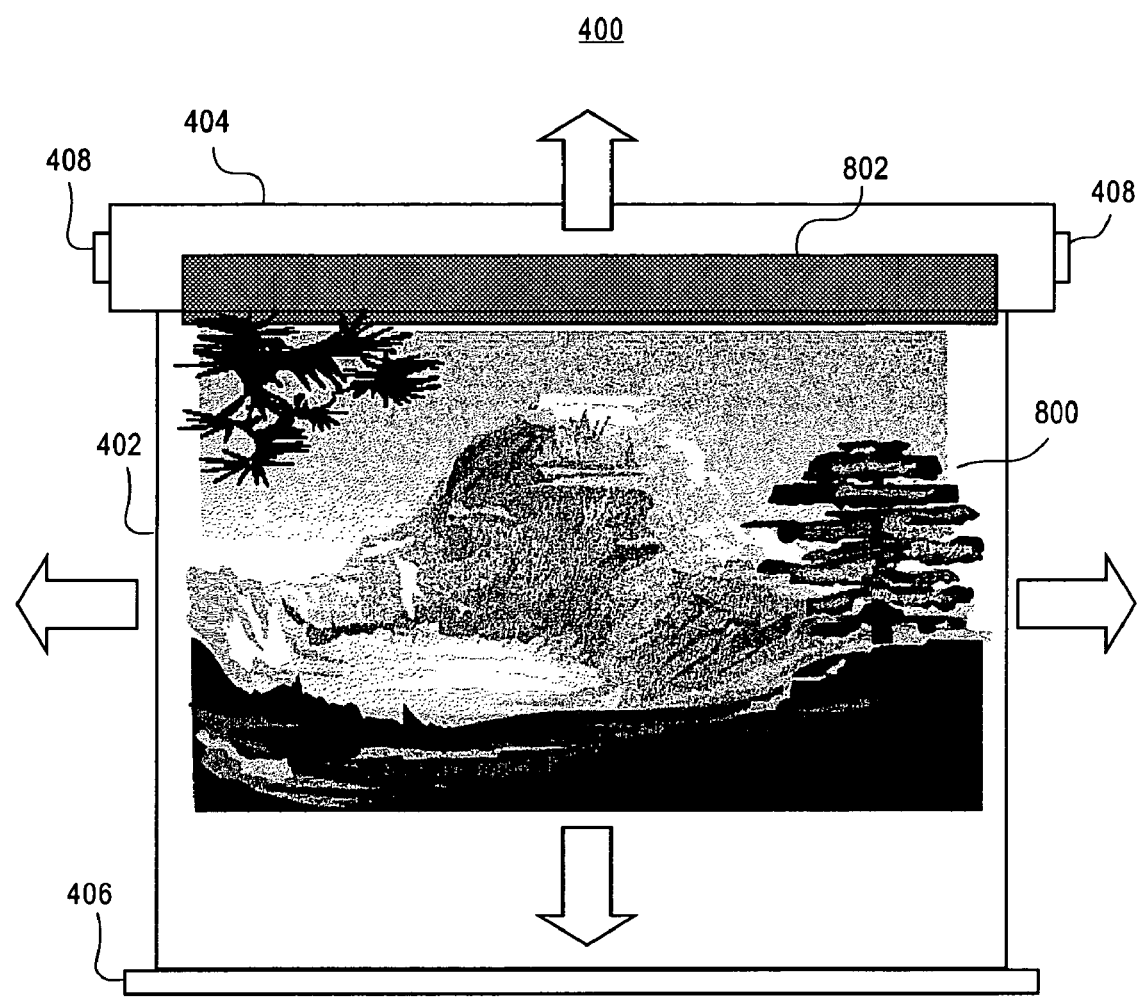

If a shifted video position has not been stored, the video image and viewing screen may be shifted so that the error at the top of the video is invisible to a user. First, video projector 204 shifts the video down to the top portion of viewing screen 402 such that the error is no longer visible on viewing screen 402 (stage 706). Video projector 204 shifts the video by moving a lens inside of video projector 204. For example, if DLP video projector 300 is used, lens 316 inside lens housing 314 is shifted. FIG. 8a illustrates the video shift in method 700 consistent with aspects of the present invention. As shown in FIG. 8a, video projector 204 projects video 800 down so that it is aligned with the top of viewing screen 402 such that error 802 is no longer visible on viewing screen 402. Further, if necessary, video projector 204 may optimally resize the video both vertically and horizontally to fit viewing screen 402 (FIG. 8c)

Next, viewing screen 402 is retracted into housing 404 until the bottom of viewing screen 402 is aligned with the bottom of the video (stage 708). If viewing screen 402 is manually operated, a user may apply force to viewing screen 402 until the bottom edge of viewing screen 402 is aligned with the bottom of the video. If viewing screen 402 is electrically operated, viewing screen 402 may be retracted using a switch located on viewing screen 402 or a remote in communication with viewing screen 402. FIG. 8b illustrates change in position of viewing screen 402 in method 700 consistent with aspects of the present invention. As shown in FIG. 8b, viewing screen 402 is retracted until the bottom edge of viewing screen 402 is aligned with the bottom of video 800.

Once the video has been shifted to the top portion of viewing screen 402, the shifted lens position may be stored in memory in video projector 204 (stage 710). For example, if DLP video projector 300 is being utilized, the shifted position of lens 314 may be stored in non-volatile memory in controller 318 or in the memory on DLP circuit board 310. Additionally, if projection screen 202 is electrically operated, the retracted position of viewing screen 250 may be stored in memory located in housing 252 (stage 712). If the shifted lens position or the retracted position of viewing screen 402 is stored in memory, the video and viewing screen may be easily adjusted to match the aspect ratio of the video next time video projector 204 generates video (stage 714).

Additionally, the shifted lens position and the retracted position of viewing screen 402 may be stored in the same memory. For example, the shifted position of lens 316 and the retracted position of viewing screen 402 may be stored in non-volatile memory in controller 318 or the memory of DLP circuit board 310. Accordingly, when the shifted position of lens 316 and retracted position of viewing screen 402 are recalled (stage 714), controller 318 may communicate the retracted position of viewing screen 402 to display screen 400 via input/output ports 320.

Method 500 and 700 describe a process by which the video is shifted down to the top of a viewing screen and the viewing screen is retracted upward. One skilled in the art would realize that method 500 and 700 may be performed on a viewing screen which open upward and retracts downward. In such a case, the housing of video screen would be located at the bottom of the viewing screen. Nonetheless, the stages of methods 500 and 700 would be performed in the same manner such that the image is shifted in the opposite direction from the screen housing.

Further, methods 500 and 700 describe an exemplary process in which the video is shifted vertically. Nonetheless, method 500 and 700 may shift the video in any direction including the horizontal direction. Further, in method 500 and 700, the video may be resized the both the horizontal and vertical directions.

Other aspects of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of displaying video, comprising:
    projecting the video onto a viewing screen;
    determining if an aspect ratio of the video matches dimensions of the viewing screen;
    shifting the video to align a first edge of the video with a first edge of the viewing screen;
    moving the viewing screen to align a second edge of the viewing screen with a second edge of the video; and
    storing a position of the video in a non-volatile memory.

2. The method of claim 1, wherein shifting the video comprises moving a lens in a projector projecting the video.

3. The method of claim 1, wherein moving the viewing screen comprises retracting the viewing screen.

4. The method of claim 1, wherein storing the position of the video in a memory device, comprises storing a position of a lens in a projector projecting the video.

5. The method of claim 4, wherein storing the position of the video in a memory device, comprises storing a position of the viewing screen.

6. The method of claim 1, wherein the first edge of the video and the first edge of the viewing screen are a bottom edge of the video and a bottom edge of the viewing screen, respectively.

7. The method of claim 6, wherein the second edge of the video and the second edge of the viewing screen are a top edge of the video and a top edge of the viewing screen, respectively.

8. The method of claim 1, further comprising resizing the video.

9. A method of displaying video, comprising,
projecting the video onto a viewing screen;
determining if the video contains errors;
shifting the video to display only portions of the video that do not contain errors;
moving the viewing screen to align the viewing screen with the video; and
storing a position of the video in a non-volatile memory device.

10. The method of claim 9, wherein shifting the video comprises moving a lens in a projector projecting the video.

11. The method of claim 9, wherein moving the viewing screen comprises retracting the viewing screen.

12. The method of claim 9, wherein storing the position of the video in a memory device, comprises storing a position of a lens in a projector projecting the video.

13. The method of claim 12, wherein storing the position of the video in a memory device, comprises storing a position of the viewing screen.

14. The method of claim 9, further comprising resizing the video.

15. A system for displaying video, comprising:
a front video projection device coupled to a video source for generating a video image based on a video signal, wherein the video projection device includes a lens capable of shifting video generated by the video projection device;
a non-volatile memory coupled to the video projection device for storing a shifted video position; and
a video display screen for displaying video generated by the video projection device,
wherein the video display screen is capable of being resized to fit the shifted video generated by the video projection device.

16. The system of claim 15, wherein the video display screen includes a memory for storing a position of the video screen.

17. The system of claim 15, wherein the video projection device and the video source are housed in a single housing.

18. A system for displaying video, comprising:
a video source device for generating a video signal;
a rear video projection device coupled to the video source device for generating a video image based on the video signal, wherein the video projection device includes a lens capable of shifting video generated by the video projection device;
a non-volatile memory coupled to the video projection device for storing a shifted video position; and
a video display screen for displaying video generated by the video projection device,
wherein the video display screen is capable of being resized to fit the shifted video generated by the video projection device.

19. The system of claim 18, wherein the video projection device and the video source are housed in a single housing.

20. A system for displaying video, comprising:
means for generating a video signal;
means for generating a video image based on the video signal;
means for shifting video generated by a video projection device;
means for storing a shifted video position; and
means for displaying video generated by the video projection device, wherein the screen of the means for displaying the video generated by the video projection device is capable of being resized to fit the shifted video generated by the video projection device.

* * * * *